Feb. 10, 1970                R. KOBLER                 3,494,051
                KEYBOARD APPARATUS FOR TEACHING MACHINE
Filed Sept. 25, 1967                            3 Sheets-Sheet 1
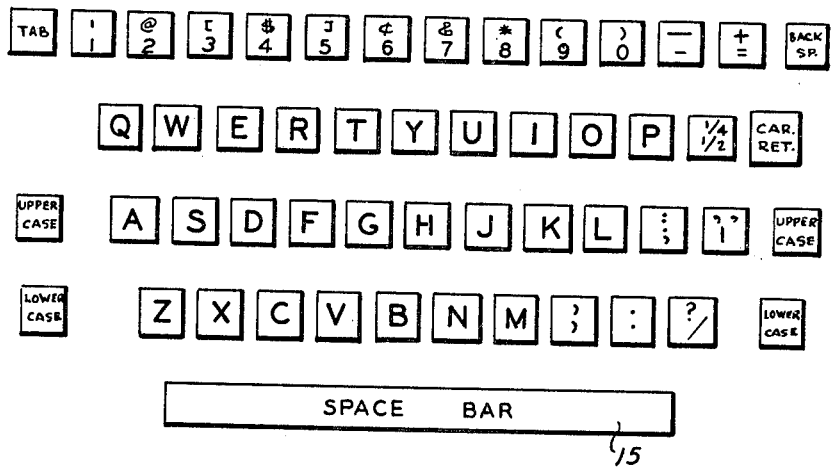
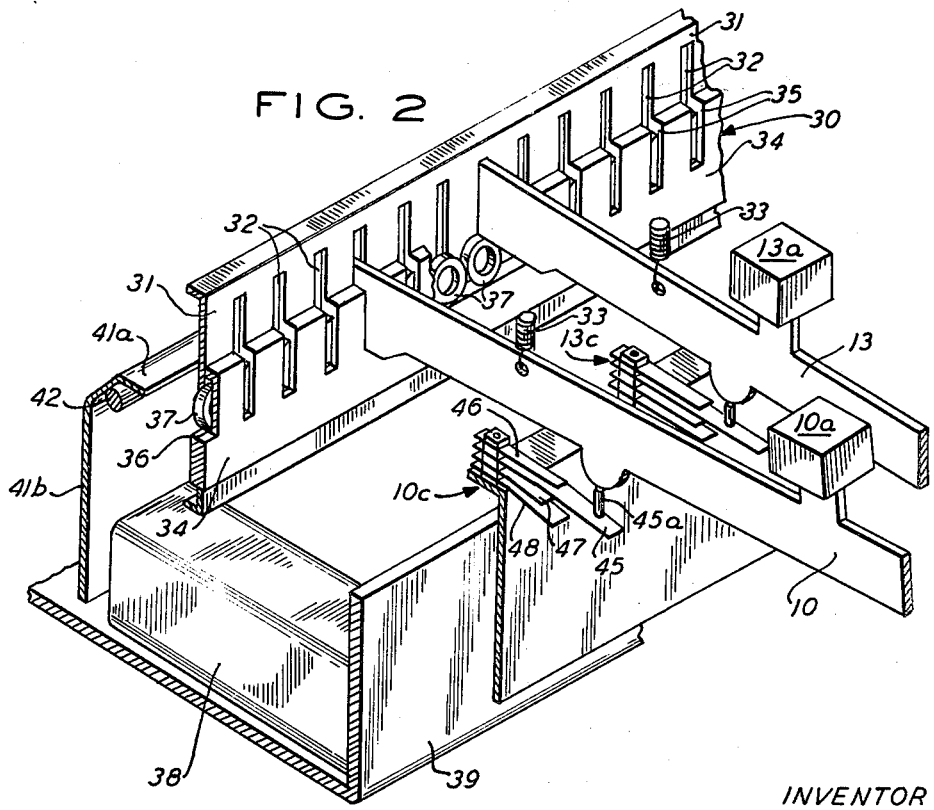
INVENTOR
RICHARD KOBLER
BY George H. Fritzinger
        AGENT Feb. 10, 1970   R. KOBLER   3,494,051
KEYBOARD APPARATUS FOR TEACHING MACHINE
Filed Sept. 25, 1967   3 Sheets-Sheet 2
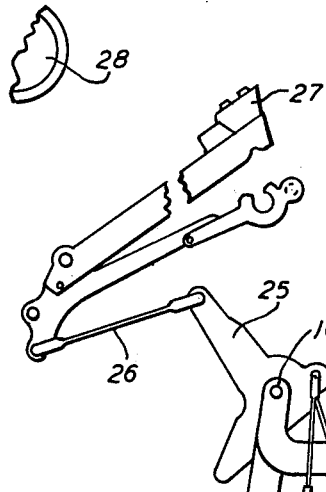
FIG. 3
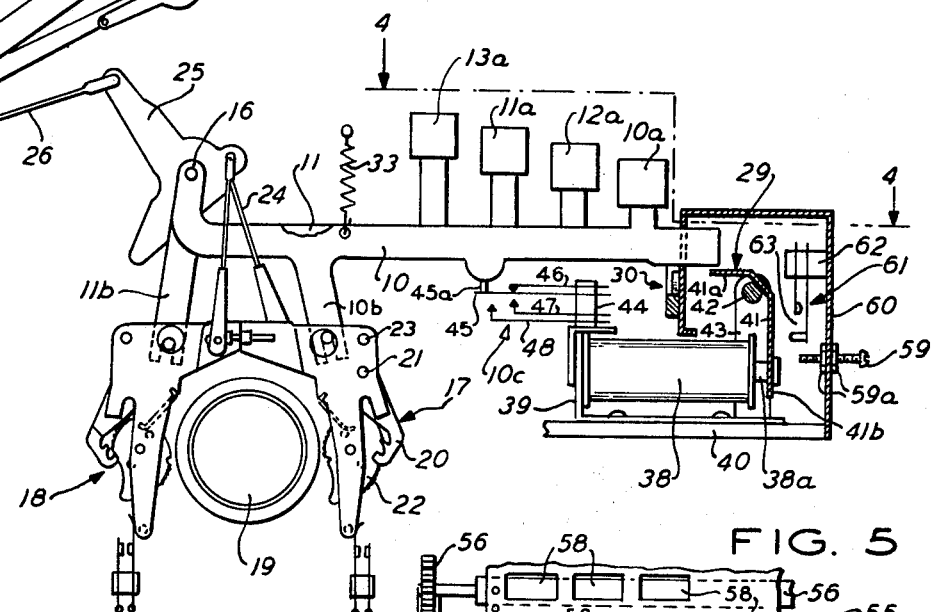
FIG. 5
FIG. 4
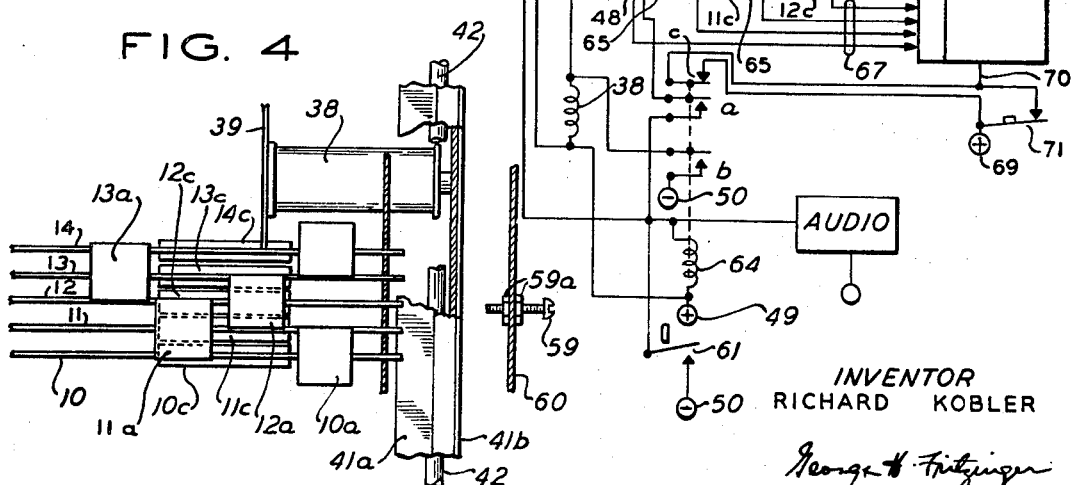
INVENTOR
RICHARD KOBLER
BY George H. Fitzinger
AGENT Feb. 10, 1970  R. KOBLER  3,494,051
KEYBOARD APPARATUS FOR TEACHING MACHINE
Filed Sept. 25, 1967  3 Sheets-Sheet 3

INVENTOR
RICHARD KOBLER
BY George H. Fritzinger
AGENT

United States Patent Office 3,494,051
Patented Feb. 10, 1970

1

3,494,051
KEYBOARD APPARATUS FOR TEACHING MACHINE
Richard Kobler, West Orange, N.J., assignor to McGraw-Edison Company, Elgin, Ill., a corporation of Delaware
Filed Sept. 25, 1967, Ser. No. 670,092
Int. Cl. G09b 13/04
U.S. Cl. 35—5      16 Claims

ABSTRACT OF THE DISCLOSURE

This invention relates to a keyboard for a teaching machine wherein the respective keys are rendered operable selectively by an encoding apparatus. The invention comprises an electromagnet having an armature common to all of the key levers for blocking the key levers against being moved past a pre-travel range when the electromagnet is energized. A switch means for the electromagnetic blocking means is controlled by each key lever in the movement thereof in its pre-travel range for enabling an encoded key lever to be depressed and for blocking all other key levers. Also, a key lever interlock is provided for preventing operation of more than one key lever at a time, and an error read-out means is provided for indicating which key levers the pupil has attempted to depress before finding the encoded key lever.

---

Heretofore, the selective blocking of the key levers of a keyboard has been carried out by means of a translator mechanism comprising a set of usually six slidably mounted permutation bars operable by respective solenoids, and a set of cooperating seeker bars interposed between the key levers and a blocking bail in a manner such that the individual seeker bars are freed to permit operation of the respective key levers when the permutation bars are operated in predetermined group arrangements. This mechanism is however very complicated, expensive and bulky, and is also subject to mutilation.

An object of the present invention is to provide a very simple and economical mechanism for selectively unlocking a keyboard as of a teaching machine or of other equipment.

Another object of the invention is to provide a common electromagnetically operated locking bar for the entire keyboard which however permits each key to be moved through an inoperative pre-travel range, and to provide control means operated by the respective key levers to unlock the keyboard "on the fly" by movement of an encoded key lever through its pre-travel range. This simple unlocking mechanism used in conjunction with a standard ball-race to prevent more than one key from being operated at a time provides a positive and simple mechanism for selectively enabling the individual keys to be operated.

Another object of the invention is to provide a selective blocking arrangement for a keyboard of a teaching machine which with the use of standard auxiliary apparatus enables a record to be made of the identity and number of keys which a pupil may attempt to depress before finding a correct or encoded key responsive to a visual or audio instruction.

Another object is to provide a selective keyboard apparatus including a common key lever blocking means allowing each of the keys to be moved through a free pre-travel range and a control means for causing the blocking means to be energized "on the fly" whenever any key lever other than an encoded key lever is depressed in its pre-travel range.

These and other objects and features of this invention will be apparent from the following description and the appended claims.

2

In the description of my invention reference is had to the accompanying drawings, of which:

FIGURE 1 is a plan view of a typical keyboard as of a typewriter;

FIGURE 2 is a fractional perspective view showing the common key lever blocking mechanism and the ball-race interlock mechanism for the key levers;

FIGURE 3 is a side view of the key lever, cam, bell crank and type bar mechanism;

FIGURE 4 is a fractional sectional view taken on the line 4—4 of FIGURE 3;

FIGURE 5 is a circuit diagram for the first embodiment of the invention shown by the above figures;

Figure 6:
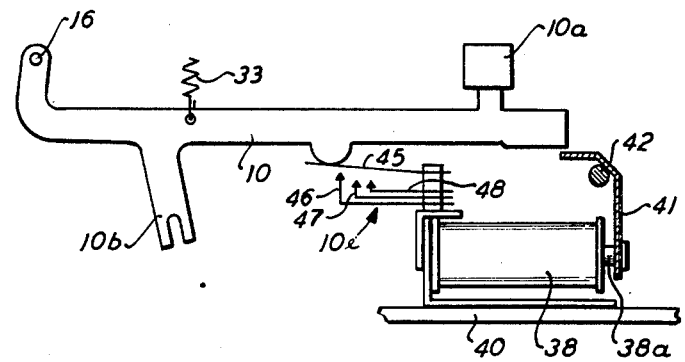
FIGURE 6 is a fractional view similar to FIGURE 3 illustrating a second embodiment of the invention.

A keyboard comprises a set of key levers of which only several are shown and designated from 10 to 14. The key levers have respective upstanding keys designated 10a to 14a. The key levers are typically spaced ⅜″ apart and the respective keys are staggered as with respect to the key levers (FIGURE 4) so that the keys are arranged side-by-side in four horizontal rows at successive lower levels proceeding from back-to-front as shown in FIGURES 1 and 3. The upper faces of the keys have symbols imprinted thereon such as of letters, numbers, punctuation marks, etc. as shown in FIGURE 1. Also, one of the key levers is provided with a wide space bar 15 ahead of the four rows of keys.

All of the key levers are pivoted at their rearward end portions on a common shaft 16. Depending from the key levers are coupling arms designated by the numbers of the key levers with the suffix letter b. These arms are connected to cam units 17 and 18 respectively in front and back of a motor driven power roll 19 as in a standard electric typewriter. When, for example, the key 10 is depressed a release lever 20 of cam unit 17 is turned about the pivot 21 causing a cam 22 to be engaged with the power roll 19 whereby to shift the cam unit 17 counter-clockwise about a pivot 23. By this movement of the cam unit there is imparted through a link 24 an impulse movement to a bell crank lever 25 which in turn imparts through a link 26 an impulse movement to a respective type bar 27 to be struck against a platen 28. When the key 11 is depressed the rearward cam unit 18 is activated by the power roll 19 in a similar manner to cause another type bar to be struck against the platen. For more detailed description of this typing mechanism reference may be had to Patent No. 3,112,569, dated Dec. 3, 1963.

In teaching machines employing typewriter keyboards, the keys are normally blocked and an encoding means is provided to release the keys selectively as in correspondence with letters or other symbols or words shown or described to the pupil. Heretofore, the selective unblocking of the keyboard has been carried out with the use of complicated permutation and cooperating seeker bars as is described in the Kobler et al. Patent No. 3,281,959, dated Nov. 1, 1966. The present invention employs instead a common blocking mechanism 29 for all of the key levers, which is released "on-the-fly" by depression of an encoded key lever through an initial pre-travel range. Also, there may be provided cooperating key lever interlock 30 which may be of a standard ball-race construction to allow only one key to be depressed at a time.

The key lever interlock may comprise a flanged bar 31 having a series of slots 32 through which pass the respective key levers (FIGURE 2). The key levers are biased upwardly by tension springs 33 so that they are held normally in unoperated positions against the upper ends of the slots 32. Below the normal positions of the key levers is a channel bar 34 which is of a comb-like construction having open-ended slots 35 registering with the respective slots 32. The bar 31 and channer bar 34 form a raceway 36 in which there is a series of rollers 37 of a number less by one than the number of the key levers. The rollers fall short of fully spanning the length of the raceway by the width of a single key lever. When a key lever is depressed, say by as little as .015", it will begin to enter between the two adjacent rollers 37 and cam the rollers apart sufficiently to prevent a second key lever from being depressed into the raceway until the prior key lever is released. A full stroke of a key lever to operate a type bar is typically .180" with the result that the interlock permits only one type bar to be operated at a time.

The common blocking mechanism for the key levers comprises an electromagnet 38 (FIGURES 3 and 4) secured by a bracket 39 to a base plate 40, and a cooperating armature 41 secured to a shaft 42 which is pivoted at its ends in brackets 43 upstanding from the base plate 40. The armature 41 is of the shape of a long beam extending the width of the keyboard. This beam is of the shape of an inverted L in cross section having its pivot axis at or near the vertex of the two legs of the beam. The tip of the top horizontal leg 41a of this armature is spaced typically at about .050" below the free ends of the key levers to allow the key levers to have this pre-travel range, and the depending leg 41b of the armature extends downwardly past the central magnetic core 38a of the electromagnet to lock the key levers when the armature is drawn against the core.

Each key lever operates a respective switch designated by the number of the key lever with the suffix letter c. As is shown in FIGURE 3 each switch may comprise a set of four cantilever springs mounted insulatively in a stack 44 itself mounted for example on the bracket 39. The second cantilever spring 45 from the top of the stack is a pole member which makes normally with the upper contact 46. This pole member carries an insulating pad 45a interposed between the free end thereof and the bottom edge of the respective key lever. When a key lever is depressed into the key lever interlock 30 the pole member 45 breaks with the upper contact 46. In the further depressing of the key lever by less than the .050" pre-travel, say by .030", the pole member 45 makes with the pair of lower contacts 47 and 48. Each key lever switch has a width dimension less than the 3/16" spacing between the successive key levers so that the switches can be mounted in a row laterally of the machine as shown in FIGURE 4.

The blocking electromagnet 38 (FIGURES 3 and 5) is connected between plus and minus terminals 49 and 50 of a D.C. source as of a battery (not shown) via the normally closed contacts 45–46 of the key lever switches in series. Thus, the electromagnet 38 stands normally energized to block all of the key levers against being moved past their pre-travel range.

An encoding means is provided which by way of illustrative example may comprise an encode switch 60 for each key lever designated by the number of the key lever with the suffix letter d, which encode switch is connected across the normally closed contacts 45–46 of the respective key lever switch. Each encode switch may comprise a pair of contacts 52–53 biased to engage a common conductor plate 54. Interposed between the encode switches and the conductor plate 54 is an insulating web or tape 55 which is advanced by steps by a sprocket roller 56 operated by a solenoid 57 through a ratchet mechanism 57a. At each step or encode position, the tape 55 has a series of openings 58 for allowing all but a selected one of the encode switches to close through the plate 54. The key lever switch which is not so shorted by the encode switches is the encoded key lever. Only when an encoded key lever is depressed to the end of its stroke is the solenoid 57 operated.

When any of the key levers except the encoded one is depressed, the resultant opening of the contacts 45–46 of the respective key lever switches is without effect because these switches are shorted by the respective encode switches. However, when an encoded key lever is depressed, the resultant opening of the contacts 45–46 of the respective key lever switch will break the circuit of the blocking electromagnet 38 and allow the encode key lever to be moved to the end of its stroke. This is illustrated with respect to the key lever 10 in FIGURE 5. Since the key lever switch is opened when the key lever enters the interlock 30—i.e., after about .015"—and the key lever has a .050" pre-travel range before it reaches the blocking armature 41, there is sufficient elapsed time during the depression of the key lever to allow the magnetic field of the electromagnet to collapse before the key lever reaches the blocking armature with the result that the encoded key lever can be depressed into its operative range without any momentary detenting thereof. Further, since the key lever interlock has come into play as soon as the circuit of the electromagnet is opened, the pupil will be able to depress only the encoded key lever to the end of its stroke.

The length of stroke of an encoded key lever may be set by an adustable stop screw 59 for the armature 41 threaded through the frame wall 60 and secured in place by lock nuts 59a. A common "end-of-stroke" key lever switch 61 is provided as an operation sensor to detect when a key lever is depressed sufficiently to produce a typing operation. This common switch may be mounted in an insulating stack 62 secured also to the frame wall 60, and is operated through an insulating pin 63 by the armature 41. The common switch 61 is connected serially between plus terminal 49 and negative terminal 50 via the solenoid 57 and via the coil of an electromagnetic "hold" relay 64 (FIGURE 5). This relay has two sets of normally open contacts marked a and b. The a contacts are in a hold circuit for the relay running from the coil of the relay to a common lead 65 connecting together all of the contacts 47 of the key lever switches. Since the pole member 45 of the encoded key lever switch is engaged with the contact 47 of the respective switch when the common switch 61 is closed, the hold circuit is completed through the unoperated key lever switches to minus terminal 50 and is maintained until the pole 45 of the encoded switch breaks with the contact 47 during return of the key lever. Thus, the relay 64 is held operated until the pole 45 brakes with the contact 47 of the encoded key lever switch during return of the key lever to unoperated position. The b contacts of the relay 64 connect the coil of the blocking electromagnet 38 to the minus terminal 50 to reenergize the blocking electromagnet at the end of stroke of the encoded key lever. This energization of the blocking electromagnet causes the armature 41 to be pressed against the operated key lever to assist in return of the key lever to unoperated position. The energization of the blocking electromagnet is continuous during the return of the key lever. Upon the return of the key lever switch to an unoperated position the armature 41 again engages the core 38a to block each of the key levers of the entire keyboard against being manually moved past its pre-travel range.

The contacts 48 of the key lever switches—which are contacted by the pole 45 by depressing any key lever within its pre-travel range—are connected by respective lead wires of a cable 67 to an error read-out device 68. This read-out device may be of any suitable form for recording the number and identity of the key levers which a pupil may depress before finding the encoded key in response to a visual or audio instruciton. For instance, the read-out device may be a typing unit in which each key is operated from a lead line of the cable 67 by a respective solenoid, or it may be a Sanborn paper recording instrument wherein each lead wire of the cable connects to a marking device to make an identifying mark on a moving paper tape when a key lever switch is operated. Still further, the lead wires of the cable 67 may connect to a diode matrix to punch a paper tape with identifying marks which can be visually read or be analyzed by standard computer techniques.

Figure 7:
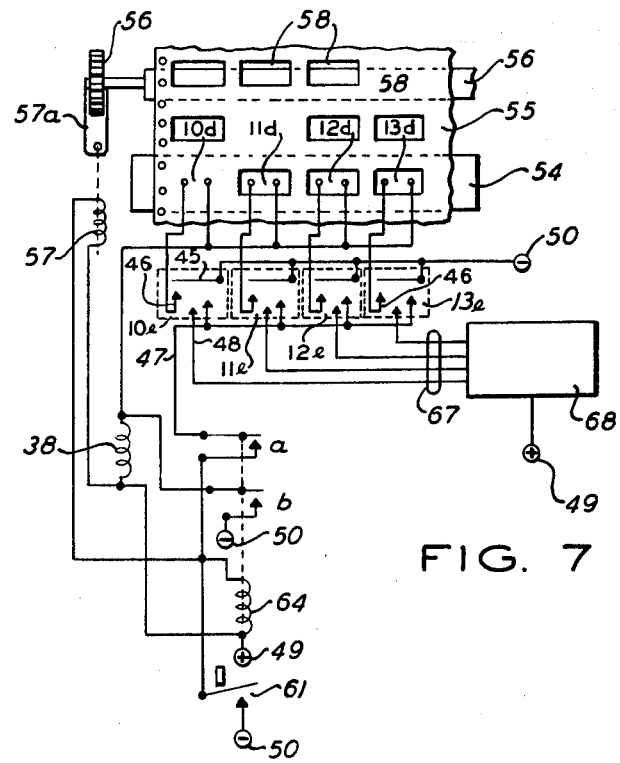
FIGURE 7 is a circuit diagram similar to FIGURE 5 according to the second embodiment.

In the embodiment of the invention shown in FIGURES 6 and 7 the blocking electromagnet stands normally unenergized and is energized "on the fly" when any key lever is depressed other than an encoded key lever. Each key lever switch now designated by the number of the key lever with the suffix letter e, differs from the foregoing embodiment in that the pole 45 stands normally broken from all other contacts. Further, the contacts 45–46 of the respective key lever switches—which are engaged by the initial depression of a key lever—are connected in parallel through the respective code switches with respect to the blocking electromagnet 38. Thus, the blocking electromagnet 38 stands normally in an unenergized state ready to be energized "on the fly" by the depression of a key lever. However, the encode switch of an encoded key lever is open to disable the respective key lever switch and to allow the encoded key lever to be pressed through to the end of its stroke without any activation of the blocking electromagnet. An advantage of this embodiment is that as an encoded key lever is depressed the blocking electromagnet remains unenergized from the start with the result that the speed at which an encode key lever can be depressed is unlimited. Further, since the initial depression of an unencoded key lever energizes the blocking electromagnet almost instantaneously to prevent the movement of the key lever past its pre-travel range, and since the depression of an encoded key lever will result in that key lever being moved to the end of its stroke only if all other key levers are in the unoperated position, there is no definite need in this second embodiment for the key lever interlock 30 to permit only one key to be depressed at a time.

In the embodiment of the invention shown in FIGURE 5 the error read-out device 68 is shown as receiving operating voltage from a plus terminal 69 as of a battery (not shown) via a circuit 70 which includes a manual on-off switch 71 in parallel with a normally closed switch c of the hold relay 64. Further, the error read-out device includes at its input side a delay section 72 which delays the operation of the device by at least more than the time elapsed in pressing an encoded key lever from the point where the key lever switch makes with the contacts 47–48 to the point where the common switch 61 is operated. When the manual switch 71 is closed the error read-out device is activated the instant the key lever switch 45 makes with the contacts 47–48, and this activation remains throughout the depression of the key lever to the end of its stroke so that each attempted operation of a key lever is recorded whether it is an encoded key lever or not. However, when the manual switch 71 is shifted to its open position, the error read-out device receives operating voltage only via the switch c of the hold relay. Now, each time the pupil presses the wrong—i.e., not encoded—key lever and holds the key lever down against the blocking electromagnet for the fraction of a second representing the timing of the delay section 72—which the pupil will normally do—the error read-out device 68 is operated the same as above-described. However, when the pupil presses an encoded key lever the power to the read-out device 68 is cut off the instant the key lever reaches the end of its stroke by the opening of the switch c of the hold relay. Since the momentary power connection to the read-out device is in this case not as long as the timing of the delay section 72 the error read-out device is not operated. Thus, when the manual switch 71 is in its open position the error read-out device is activated only to record errors.

The embodiments of my invention herein particularly shown and described are intended to be illustrative and not necessarily limitative of my invention since the same are subject to changes and modifications without departure from the scope of my invention, which I endeavor to express according to the following claims.

I claim:

1. In a keyboard apparatus: the combination of a row of manually depressible key levers, means biasing said key levers to unoperated positions, a blocking electromagnet having an armature coacting with all of said key levers to prevent manual depressing of the respective key levers by more than a free pre-travel distance when said electromagnet is energized, a switch for each of said key levers operated by the respective key lever during depression thereof in its pre-travel range, an energizing circuit including said key lever switches for respectively controlling said blocking electromagnet as said key levers are pressed through their pre-travel ranges, and encoding means for abling and disabling the key lever switches according to a prearranged pattern.

2. The keyboard apparatus set forth in claim 1, wherein said key lever switches are normally open and said circuit includes said key lever switches in parallel for energizing said electromagnet when a key lever is depressed through an initial portion of its pre-travel range, and wherein said encode means includes switches in series with said respective key lever switches for disabling a key lever switch when the respective encode switch is open.

3. The keyboard apparatus set forth in claim 1 including an error read-out device, and means for controlling said read-out device by said key lever switches whereby to activate the read-out device to identify which key levers are partially depressed prior to depressing an encoded key lever.

4. The keyboard apparatus set forth in claim 1 including utilization means selectively operated by depression of said key levers to the end of their strokes, and means for resetting said encoding means at the end of stroke of each key lever.

5. The keyboard apparatus set forth in claim 1 including utilization means selectively operated by depression of said key levers past their pre-travel ranges, and an electromagnetic relay operated by depression of an encoded key lever to the end of its stroke for applying a force to assist the return of the depressed key lever to unoperated position.

6. The keyboard apparatus set forth in claim 5 including a hold circuit for said electromagnetic relay including said key lever switches to keep the electromagnetic relay energized during release of an encoded key lever until the released key lever reaches an initial portion of its pre-travel range.

7. In a keyboard apparatus: the combination of a row of manually depressible key levers, means biasing said key levers to unoperated positions, a blocking electromagnet having an armature coacting with all of said key levers to prevent manual depressing of the respective key levers by more than a free pre-travel distance when said electromagnet is energized, a normally closed key lever switch for each key lever opened responsive to depressing the respective key lever through its pre-travel range, and energizing circuit for said blocking electromagnet including said key lever switches in series, encoding means respectively shunting the key lever switches except the switch corresponding to an encoded key lever for deenergizing said electromagnet as an encoded key lever is depressed whereby to allow the encoded key lever to be depressed through its entire range, and a key lever interlock means responsive to a partial depressing of any of said key levers for blocking all of the other of said key levers.

8. A keyboard apparatus set forth in claim 7 wherein said key lever switches are operated by depressing the respective key levers through an initial portion of their pre-travel ranges extending into the ranges wherein said key lever interlock means is operative.

9. The keyboard apparatus set forth in claim 7 wherein the pre-travel range established by said blocking electromagnet extends substantially past the point whereas said key lever interlock means is effective.

10. In a keyboard apparatus: the combination of a row of key levers respectively depressible through an operating range to perform respective control functions, means common to all of said key levers for blocking the key levers against being depressed beyond a pre-travel range, encoding means for said key levers, and means controlled by said encoding means and operated by an encoded key lever as the same is moved in its pre-travel range for rendering said blocking means ineffective whereby to allow an encoded key lever to be pressed through its entire range.

11. The keyboard apparatus set forth in claim 10 including a key lever interlocking means operable by depression of an encoded key lever through its pre-travel range for blocking all other key levers.

12. In a keyboard apparatus: the combination of a row of key levers, a mechanism for permitting only one key lever to be depressed at a time, an electromagnet having an armature common as to all of the key levers for blocking the respective levers against being moved beyond a pre-travel range when the electromagnet is energized, switches for the respective key levers each operable by depressing the key lever in its pre-travel range, circuit means including said key lever switches in series for energizing said electromagnet when the key lever switches are not operated, and encoding means for shunting all but a selected one of said key lever switches whereby said electromagnet is dropped to remove said common blocking of the key levers only in response to depressing an encoded key lever.

13. The keyboard apparatus set forth in claim 12 including a common key switch operated when a key lever is moved to the end of its travel range, and a hold relay operated by said common key switch for activating said electromagnet to exert a return force on the depressed key lever.

14. The keyboard apparatus set forth in claim 13 including a hold circuit for said relay having therein a set of contacts of the relay in series with a section of each key lever switch, said switch sections being connected in parallel and being closed when the key lever switches are operated to cause the relay to remain energized until a depressed key lever is returned to its pre-travel range.

15. In a keyboard apparatus: the combination of a set of manually depressible key levers, means biasing said key levers to unoperated positions, a blocking electromagnet having an armature coacting with all of said key levers to prevent manual depressing of the respective key levers beyond a pre-travel distance when said electromagnet is energized, a switch for each of said key levers operated by the respective key lever during depression thereof in its pre-travel range, an energizing circuit including said key lever switches for respectively controlling said blocking electromagnet as said key levers are pressed through their pre-travel ranges, encoding means for abling and disabling the key lever switches according to a pre-arranged pattern, a read-out device, and means responsive to each depression of a key lever in its pre-travel range for activating said read-out device.

16. The keyboard apparatus set forth in claim 15 wherein said activating means includes a time-delay means, and means responsive to depression of a key lever to the end of its stroke for cutting off said activating means for said read-out device whereby to prevent activation of the read-out device when an encoded key lever is depressed to the end of its stroke within the period of said time-delay means.

References Cited
UNITED STATES PATENTS

| | | | |
|---|---|---|---|
| 3,112,569 | 12/1963 | Moore et al. | 35—5 |
| 3,166,856 | 1/1965 | Uttal | 35—6 |

EUGENE R. CAPOZIO, Primary Examiner

W. H. GRIEB, Assistant Examiner

U.S. Cl. X.R.
197—107